US012804734B2

(12) United States Patent
Takeoka

(10) Patent No.: US 12,804,734 B2
(45) Date of Patent: Nov. 17, 2026

(54) INFORMATION PROCESSING DEVICE FOR ENABLING COMMUNICATION OVER SECONDARY ACCESS NETWORK AND METHOD FOR ENABLEMENT THEREOF

(71) Applicant: TOYOTA JIDOSHA KABUSHIKI KAISHA, Toyota (JP)

(72) Inventor: Koji Takeoka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 18/586,793

(22) Filed: Feb. 26, 2024

(65) Prior Publication Data

US 2024/0414778 A1 Dec. 12, 2024

(30) Foreign Application Priority Data

Jun. 7, 2023 (JP) ................................. 2023-094041

(51) Int. Cl.
*H04W 76/10* (2018.01)
*H04W 8/18* (2009.01)
*H04W 12/043* (2021.01)
*H04W 12/069* (2021.01)

(52) U.S. Cl.
CPC ........... *H04W 76/10* (2018.02); *H04W 8/183* (2013.01); *H04W 12/043* (2021.01); *H04W 12/069* (2021.01)

(58) Field of Classification Search
CPC ... H04W 76/10; H04W 8/183; H04W 12/043; H04W 12/069; H04W 12/06; H04W 76/12; H04W 4/44; H04W 12/45; H04W 12/50
See application file for complete search history.

(56) References Cited

U.S. PATENT DOCUMENTS

2013/0157673 A1* 6/2013 Brusilovsky .......... H04W 12/02 455/450
2017/0325084 A1 11/2017 Larignon et al.
2018/0070262 A1 3/2018 Nakano et al.
(Continued)

FOREIGN PATENT DOCUMENTS

JP 2016-111660 A 6/2016
JP 2018-500805 A 1/2018
(Continued)

*Primary Examiner* — Natasha W Cosme
(74) *Attorney, Agent, or Firm* — SoraIP, Inc.

(57) ABSTRACT

The information processing device includes a storage unit that stores authentication information used for connection to a first communication system, a first eUICC that holds profile information used for connection to a first carrier network selected and contracted by a user as an access network, and a control unit. The controller receives the authentication in the first carrier network by using the profile information, establishes a connection with the first carrier network, and establishes a logical tunnel with the gateway device in the first communication system on the first carrier network. The control unit receives authentication in the first communication system by using the authentication information, and establishes a connection with the first communication system. After establishment of the connection with the first communication system, communication with the external network is performed through the logical tunnel and the first communication system.

12 Claims, 5 Drawing Sheets

(56) References Cited

U.S. PATENT DOCUMENTS

| | | | | |
|---|---|---|---|---|
| 2018/0110081 | A1 | 4/2018 | Serna et al. | |
| 2021/0360382 | A1* | 11/2021 | Kwan | H04W 12/06 |

FOREIGN PATENT DOCUMENTS

| | | | |
|---|---|---|---|
| JP | 2020-502911 | A | 1/2020 |
| JP | 2022-076592 | A | 5/2022 |
| WO | 2016/148001 | A1 | 9/2016 |
| WO | 2018/111486 | A1 | 6/2018 |

* cited by examiner

INFORMATION PROCESSING DEVICE FOR ENABLING COMMUNICATION OVER SECONDARY ACCESS NETWORK AND METHOD FOR ENABLEMENT THEREOF

CROSS-REFERENCE TO RELATED APPLICATION

This application claims priority to Japanese Patent Application No. 2023-094041 filed on Jun. 7, 2023, incorporated herein by reference in its entirety.

BACKGROUND

1. Technical Field

The present disclosure relates to wireless communication in which a SIM is used in a terminal.

2. Description of Related Art

A method is disclosed in which a connection method of a user terminal, a plurality of SIM slots, and priority are stored in association with each other, and a SIM slot is automatically switched based on the connection method of the user terminal and the priority (for example, in Japanese Unexamined Patent Application Publication No. 2022-76592 (JP 2022-76592 A)).

SUMMARY

An object of an aspect of the present disclosure is to provide an information processing device and a method capable of enabling communication via a predetermined communication system no matter what carrier network is adopted as an access network by a user.

One aspect of the present disclosure is an information processing device including:

a storage unit that stores authentication information used for connection to a first communication system;

a first eUICC that holds profile information used for connection to a first carrier network that is selected and for which a contract is made by a user as an access network; and a control unit that executes establishing the connection with the first carrier network in response to authentication in the first carrier network using the profile information, establishing a logical tunnel with a gateway device in the first communication system, on the first carrier network after connection establishment, establishing the connection with the first communication system in response to authentication in the first communication system using the authentication information through the logical tunnel, and after establishing the connection with the first communication system, performing communication with an external network through the logical tunnel and the first communication system.

Another aspect of the present disclosure is a method in which an information processing device including a storage unit that stores authentication information used for connection to a first communication system, and a first eUICC that holds profile information used for connection to a first carrier network that is selected and for which a contract is made by a user as an access network, executes:

establishing the connection with the first carrier network in response to authentication in the first carrier network using the profile information;

establishing a logical tunnel with a gateway device in the first communication system, on the first carrier network after connection establishment;

establishing the connection with the first communication system in response to authentication in the first communication system using the authentication information through the logical tunnel; and after establishing the connection with the first communication system, performing communication with an external network through the logical tunnel and the first communication system.

According to an aspect of the present disclosure, no matter what carrier network is adopted as the access network by the user, it is possible to enable communication of the information processing device via a predetermined communication system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
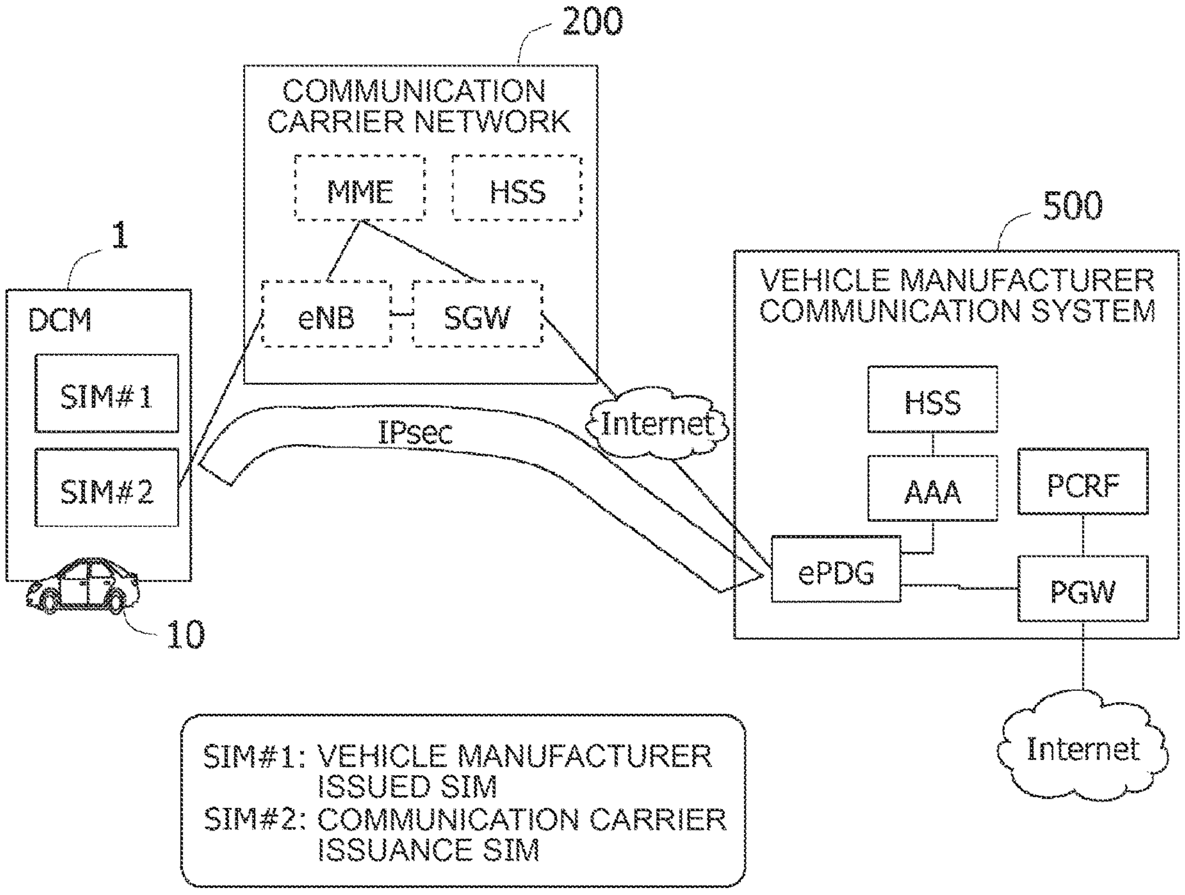
FIG. 1 is a diagram illustrating an example of a connection between a vehicle and a vehicle manufacturer communication system according to a first embodiment.

For example, in a manufacturer of a vehicle having a communication function such as a connected car and an autonomous driving vehicle, communication of the vehicle may be made via a communication system prepared by the vehicle manufacturer in order to control communication of the vehicle, collect information related to communication of the vehicle, and the like. In such a case, the carrier network used by the vehicle as the access network is limited to the carrier network of the communication carrier cooperating with the communication system of the vehicle manufacturer. Therefore, the owner of the vehicle or the like cannot freely select the carrier network to be used as the access network for the communication of the vehicle.

In one aspect of the present disclosure, in view of the above problem, an information processing device is caused to establish a logical tunnel with a gateway apparatus in a first communication system on a carrier network selected by a user as an access network. Communication is made through the tunnel. Thus, even when the user selects any carrier network as the access network, the communication of the information processing device can be made via the first communication system through the logical tunnel.

More specifically, one embodiment of the present disclosure is an information processing device including a storage unit that stores authentication information used for connection to a first communication system, a first Embedded Universal Integrated Circuit Card (eUICC) that holds profile information used for connection to a first carrier network selected and contracted by a user as an access network, and a control unit. The controller is configured to authenticate in the first carrier network by using the profile data held in the first eUICC, and to establish a connection with the first carrier network. The control unit establishes a logical tunnel with a gateway device in the first communication system on the first carrier network after connection establishment. The control unit receives authentication in the first communication system by using the authentication information held in the storage unit through the logical tunnel, and establishes a connection with the first communication system. After establishing a connection with the first communication system, the control unit performs communication with an external network through the logical tunnel and the first communication system.

The information processing device is, for example, an in-vehicle device mounted on a vehicle, a smartphone, a tablet terminal, a wearable terminal, and a terminal capable of wireless communication based on a mobile communication system. Examples of the in-vehicle device include a Data Communication Module (DCM), a car navigation device, a drive recorder, and an Electronic Control Unit (ECU). The control unit is, for example, a Central Processing Unit (CPU), a Digital Signal Processor (DSP), a processor such as a data communication processor, and a Field-Programmable Gate Array (FPGA). The storage unit holding the authentication information is, for example, an auxiliary storage device or a second eUICC.

The first communication system is a radio communication system requiring that a terminal be provided with a eUICC such as, for example, LTE-Advanced (4G), 5G, and 3G. The gateway device is, for example, in the case of Evolved Packet Data Gateway (ePDG) (4G), non-3GPP Interworking Function (N3IWF) (5G), PDG (3G), etc. The logical tunnel is, for example, an IPsec tunnel.

In one aspect, an information processing device connects to a first communication system, e.g., directly at IP layer, by establishing a logical tunnel with a gateway device in the first communication system on a first carrier network. Accordingly, the first communication system can cause the communication of the information processing device to pass through the first communication system even if the first communication system does not cooperate with the first carrier network. In addition, the user of the information processing device can freely select the first carrier network as the access network from among the plurality of communication carriers.

In one aspect of the disclosure, the authentication information may be profile information issued by the first communication system and used to connect to the first communication system. Here, the storage unit may be a second eUICC. When the information processing device holds the profile information issued by the first communication system in the second eUICC, for example, the owner of the information processing device can rewrite the profile information in order to change or enhance security.

In one aspect of the present disclosure, the authentication information may be an electronic certificate issued by a predetermined authentication authority when identification of the owner of the information processing device is performed with respect to key information used in authentication in the first communication system, and the key information. In this case, the information processing device does not need to include two eUICC, and the configuration of the information processing device can be simplified.

In one aspect of the present disclosure, the information processing device may be an in-vehicle apparatus mounted on a vehicle. In this case, the first communication system may be a communication system managed by a manufacturer of the vehicle. Thus, the communication of the vehicle can be made via the communication system managed by the vehicle manufacturer, and the vehicle manufacturer can control the communication of the vehicle and collect information related to the communication of the vehicle.

As another aspect, the present disclosure can also be specified as a method in which a computer executes processing of the information processing device, a program for causing a computer to execute processing of the information processing device, and a computer-readable recording medium in which the program is recorded.

Hereinafter, embodiments of the present disclosure will be described with reference to the drawings. The configurations of the following embodiments are illustrative, and the present disclosure is not limited to the configurations of the embodiments.

First Embodiment

FIG. 1 is a diagram illustrating an example of a connection between a vehicle 10 and a vehicle manufacturer communication system 500 according to a first embodiment. In the first embodiment, the vehicle 10 (DCM 1) is IPsec tunneled to the vehicle manufacturer communication system 500 in order to allow the communication of the vehicle 10 (DCM 1) to pass through the vehicle manufacturer communication system 500. In the first embodiment, it is assumed that the communication carrier network 200 and the vehicle-manufacturer communication system 500 are communication networks corresponding to 4G. However, the present disclosure is not limited thereto, and the communication carrier network 200 and the vehicle-manufacturer communication system 500 may be systems corresponding to 5G, a 6G, and the like.

The vehicle manufacturer communication system 500 is a communication system managed by a manufacturer of the vehicle 10. As shown in FIG. 1, the vehicle manufacturer communication system 500 includes ePDG, Home Subscriber Server (HSS), Packet data network GateWay (PGW), and Policy and Charging Rules Function (PCRF), and has a configuration close to the core-network. However, the vehicle manufacturer communication system 500 does not have a charging function, and has an Authentication Authorization Accounting (AAA) of authenticating instead of MME in a normal EPC. In the first embodiment, AAA in the vehicle-manufacturer communication system 500 performs authentication in the same manner as authentication performed by MME in the normal EPC. Note that the components of the vehicle manufacturer communication system 500 illustrated in FIG. 1 are a part, and the components included in the vehicle manufacturer communication system 500 are not limited to the components illustrated in FIG. 1.

The communication carrier network 200 is a communication carrier network contracted by the owner of the vehicle 10. The communication carrier network 200 is a normal Evolved Packet Core (EPC). Although eNode-B (CNB), Serving Gate Way (SGW), Mobility Management Mobility (MME), HSS, and the like are illustrated as components of the communication carrier network 200 in FIG. 1, components of the communication carrier network 200 are not limited thereto.

In the first embodiment, the vehicle manufacturer communication system 500 treats the communication carrier network 200 as one of Untrusted non-access 3GPP. Therefore, communication from the communication carrier network 200 to the vehicle manufacturer communication system 500 is once out of SGW of the communication carrier network 200 to the Internet and enters ePDG in the vehicle manufacturer communication system 500.

The vehicle 10 includes a DCM 1. DCM 1 is an exemplary device having a communication function. DCM 1 comprises two SIM. SIM #1 stores profile data issued by the vehicle manufacturer communication system 500. SIM #2 stores profile data issued by a communication carrier network selected and contracted by the owner of the vehicle 10 from a plurality of communication carriers.

DCM 1 is authenticated in the communication carrier network 200 by using the profile data issued by the communication carrier network 200 held in SIM #2, and establishes connectivity with the communication carrier network 200. DCM 1 then establishes an IPsec tunneling with ePDG of the vehicle manufacturer communication system 500 over the connectivity with the communication carrier network 200. After establishing IPsec tunneling, DCM 1 is authenticated in the vehicle manufacturer communication system 500 using the profile information issued by the vehicle manufacturer communication system 500 held in SIM #1 to establish connectivity with the vehicle manufacturer communication system 500. Once the vehicle manufacturer communication system 500 is established, DCM 1 may be connected to, for example, the Internet. This allows DCM 1 communications to pass through the vehicle manufacturer communication system 500. The vehicle manufacturer communication system 500 is an example of a "first communication system". The communication carrier network 200 is an example of a "first carrier network". ePDG in the vehicle manufacturer communication system 500 is an exemplary "gateway device."

In the first embodiment, the vehicle manufacturer communication system 500 treats the communication carrier network 200 as one of Untrusted non 3GPP accesses, and DCM 1 establishes a ePDG in the vehicle manufacturer communication system 500 and a IPsec tunnel on the communication carrier network 200, so that DCM 1 and the vehicle manufacturer communication system 500 are directly connected at IP layer. As a result, the vehicle manufacturer, which is the administrator of the vehicle manufacturer communication system 500, can communicate DCM 1 through the vehicle manufacturer communication system 500 without cooperating with the communication carrier of the communication carrier network 200. The cooperation with the communication carrier includes, for example, making a special contract for causing the vehicle manufacturer communication system 500 to transmit DCM 1 communication. In addition, the owner of the vehicle 10 can select the communication carrier network 200 to be freely contracted from among the plurality of communication carriers.

Figure 2:
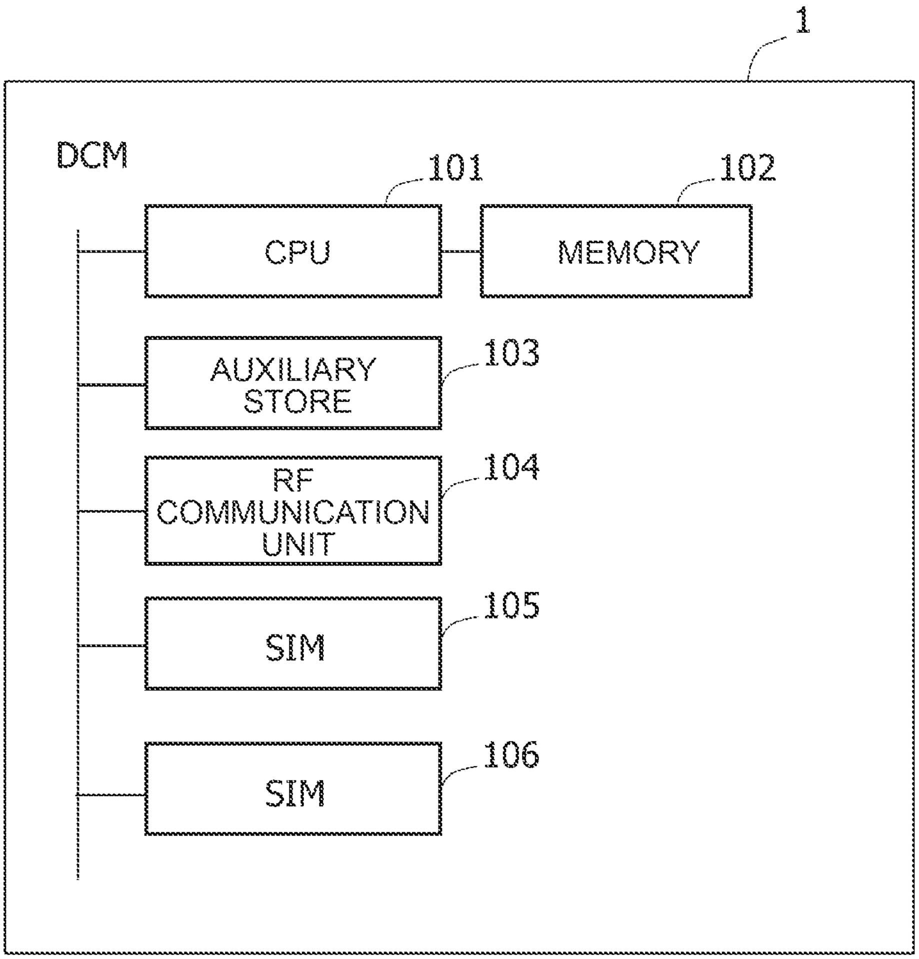
FIG. 2 is a diagram illustrating an exemplary hardware configuration of a DCM.

FIG. 2 is a diagram illustrating an exemplary hardware configuration of a DCM 1. DCM 1 includes a CPU 101, a memory 102, an auxiliary storage device 103, a radio communication unit 104, a SIM 105, and a SIM 106 as hardware configurations. The auxiliary storage device 103 is, for example, a Hard Disk Drive (HDD) and a Solid State Drive (SSD). The programs held in the auxiliary storage device 103 include, for example, Operation System (OS), a communication control program, and a plurality of other programs. The communication control program is a program that, after connecting to the communication carrier network 200 using the profile information in SIM #2, establishes an IPsec tunnel with ePDG of the vehicle manufacturer communication system 500, and connects to the vehicle manufacturer communication system 500 using the profile information in SIM #1. The memory 102 includes, for example, a solid-state memory such as Read Only Memory (ROM), Random Access Memory (RAM). Each of the memory 102 and the auxiliary storage device 103 is an example of a computer-readable recording medium.

CPU 101 executes various processes by loading and executing various programs, such as OS held in the auxiliary storage device 103, into the memory 102. The number of CPU 101 is not limited to one, and a plurality may be provided. CPU 101 is an exemplary "controller". In the first embodiment, the radio communication unit 104 communicates with an external device based on 4G mobile communication scheme. When the communication carrier network 200 is a system corresponding to 5G or the mobile communication system after 6G, the radio communication unit 104 also corresponds to the mobile communication system corresponding to the communication carrier network 200.

SIM 105 and SIM 106 are each eUICC. In the first embodiment, SIM 105 is a chip-type eUICC. SIM 106 may be chip-type or card-type. The hardware configuration of DCM 1 is not limited to the configuration shown in FIG. 2. For example, SIM 105 may be a card-type eUICC or a UICC. For example, SIM 106 may be a card-type insertable UICC. When SIM 106 is card-type, DCM 1 includes a SIM slot, a SIM card reader, and the like.

Figure 3:
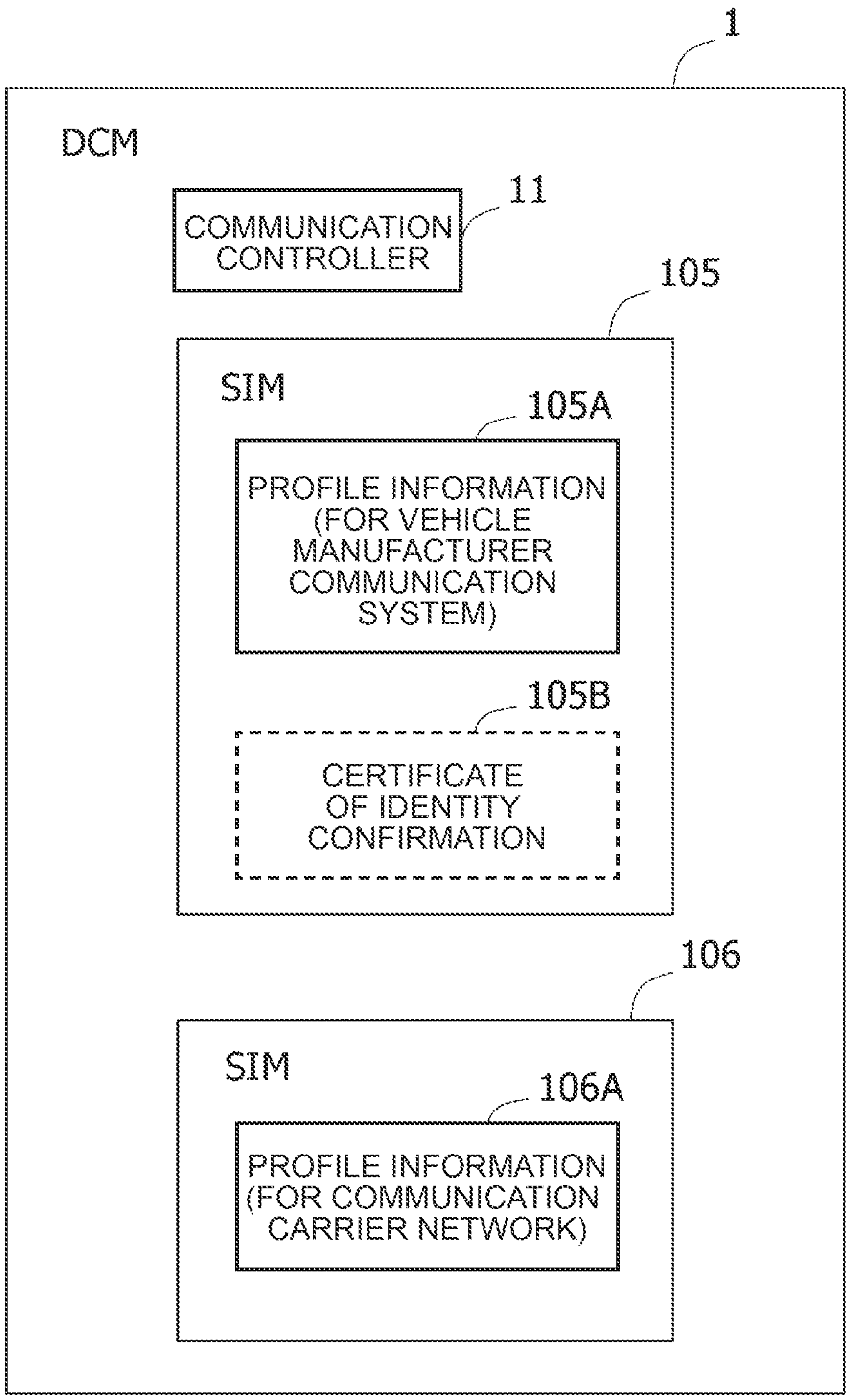
FIG. 3 is an exemplary functional configuration of a DCM.

FIG. 3 is an exemplary functional configuration of a DCM 1. DCM 1 includes a communication control unit 11 as a functional configuration. The communication control unit 11 controls the communication between DCM 1 and the vehicle-manufacturer communication system 500 using the profile data held in SIM 105 and SIM 106, respectively. Details of the processing of the communication control unit 11 will be described later.

SIM 105 stores a profile data 105A. The profile information 105A is profile information issued by the vehicle manufacturer communication system 500. The profile information 105A may be referred to as profile information for the vehicle manufacturer communication system 500. In the first embodiment, since SIM 105 is eUICC, the profile data 105A is rewritable. For example, the profile data 105A is rewritten when the owner of the vehicle 10 changes and when updating for security enhancement. In FIG. 3, the identity verification certificate 105B is also illustrated in SIM 105, but the identity verification certificate 105B is not used in the first embodiment. An embodiment in which the identity verification certificate 105B is used will be described later. SIM 105 is an exemplary "storage unit" and "second eUICC". The profile information 105A is an exemplary "profile information" held in the "authentication information" and the "second eUICC".

SIM 106 stores a profile data 106A. The profile information 106A is profile information issued by the communication carrier network 200. The profile data 106A may also be referred to as a profile for the communication carrier network 200. The profile information includes, for example, a plurality of pieces of identification information and key information used for authentication and encryption. The identifying information included in the profile information includes, for example, International Mobile Subscription Identity (IMSI) and Integrated Circuit Card ID (ICCID). SIM 106 is an exemplary "first eUICC". The profile information 106A is an exemplary "profile information".

Figure 4:
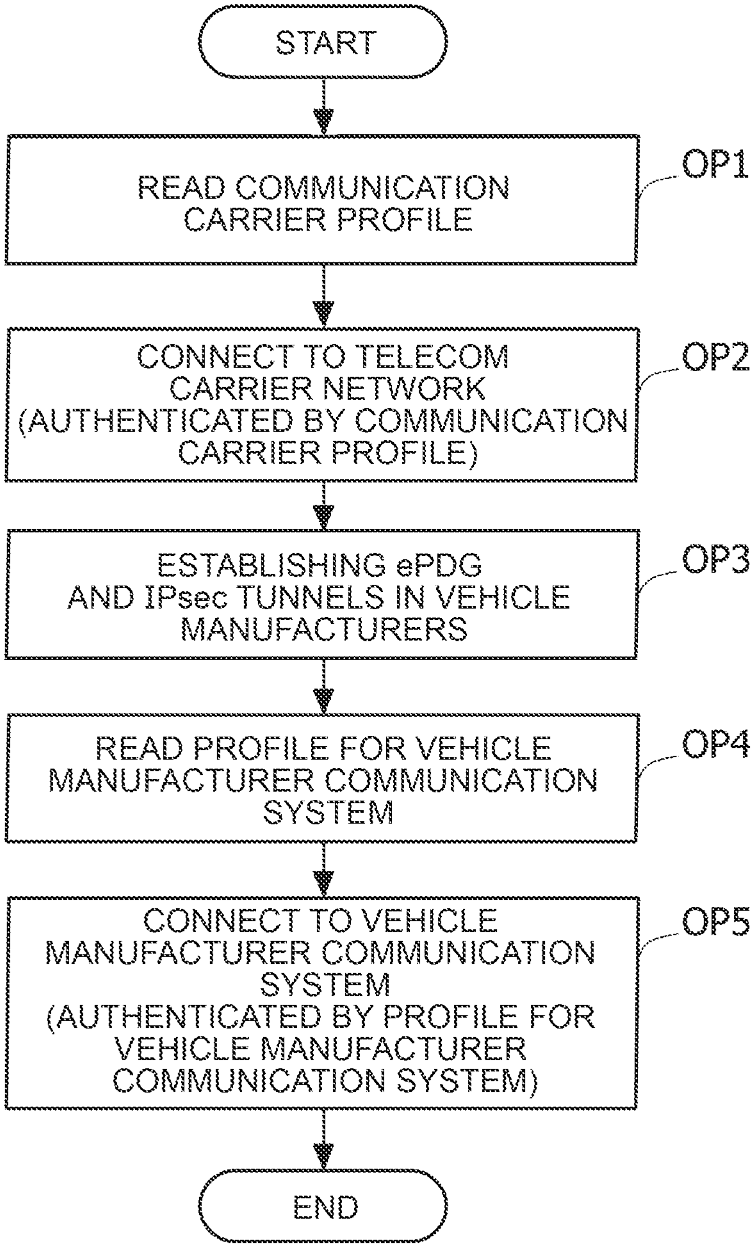
FIG. 4 is an exemplary flow chart of a DCM communication connection-establishing process.

FIG. 4 is an exemplary flow chart of a communication connection establishing process of DCM 1. The process illustrated in FIG. 4 is started, for example, when the profile data is stored in SIM #2, when SIM card of SIM #2 is inserted, or when the user is operated to connect the communication using the mobile communication method. Although the embodiment illustrated in FIG. 4 is an CPU 101, for convenience, a functional component will be mainly described.

In OP1, the communication control unit 11 reads the profile data 106A for the communication carrier network 200 from SIM 106. In OP2, the communication control unit 11 executes a process of establishing connectivity with the communication carrier network 200. In the process of establishing a connection with the communication carrier network 200, authentication is performed by the communication carrier network 200. At this time, the communication control unit 11 receives the authentication in the communication carrier network 200 using the profile information 106A. If the authentication is successful, a connection with the communication carrier network 200 is established.

In OP3, the communication control unit 11 executes a process of establishing an IPsec tunneling with ePDG in the vehicle manufacturer communication system 500. In the process of establishing IPsec tunnel, the communication control unit 11 performs a process for establishing IPsec tunnel addressed to ePDG. For example, the information related to ePD used in the process of establishing IPsec tunneling is acquired with information included in the profile information 105A as a clue. An IPsec tunnel is an exemplary “logical tunnel.”

In OP4, the communication control unit 11 reads the profile data 105A for the vehicle manufacturer communication system 500 from SIM 105. In OP5, the communication control unit 11 executes a process of establishing a connection with the vehicle manufacturer communication system 500. In the process of establishing a connection with the vehicle manufacturer communication system 500, authentication is performed by the vehicle manufacturer communication system 500. At this time, the communication control unit 11 receives the authentication in the vehicle manufacturer communication system 500 using the profile information 105A through IPsec tunnel. When the authentication is successful, a connection with the vehicle manufacturer communication system 500 is established. Thereafter, DCM 1 can communicate with the Internet or the like through the vehicle-manufacturer communication system 500 through IPsec tunnel.

Figure 5:
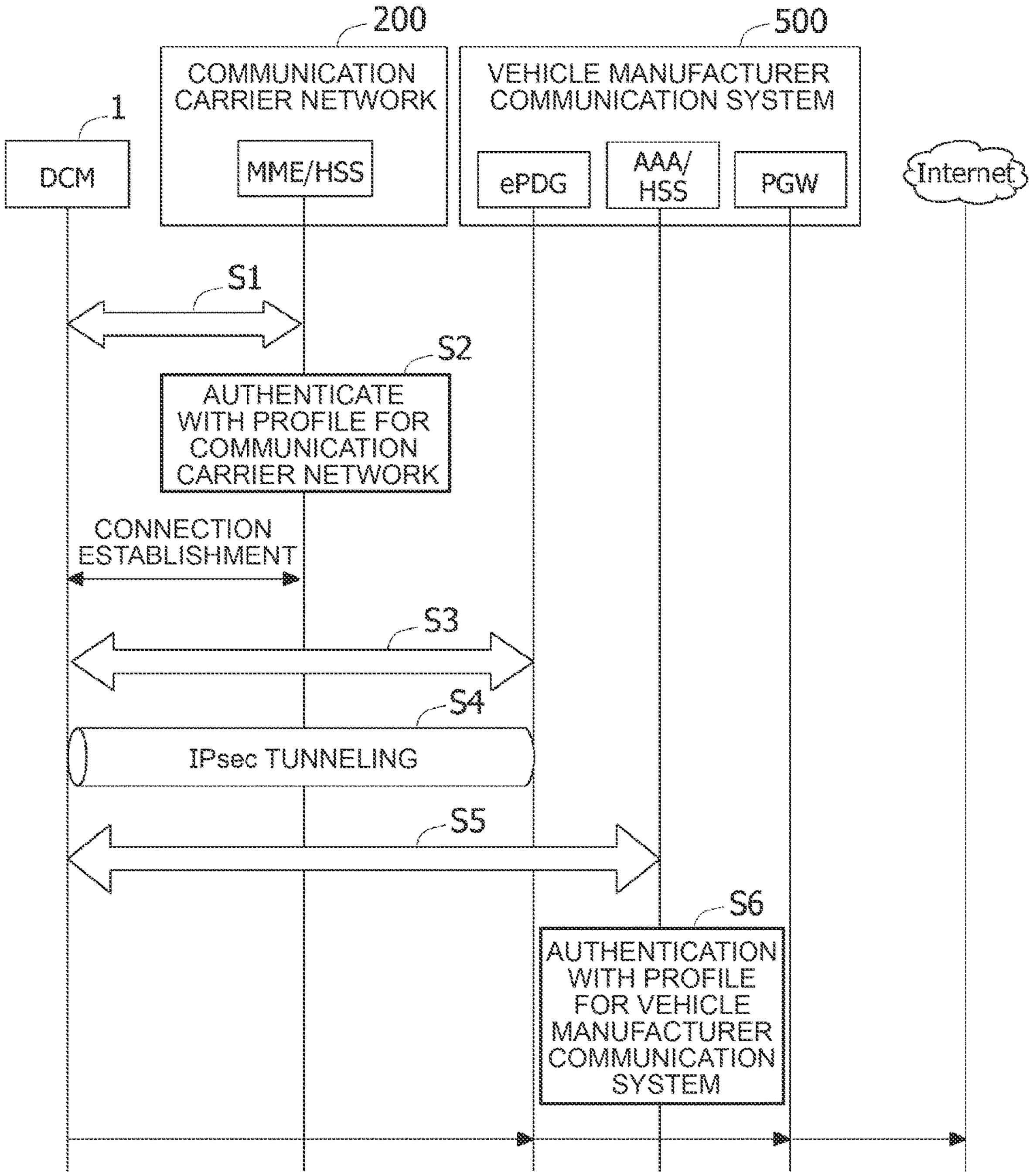
FIG. 5 is an exemplary sequencing to establish connectivity with DCM vehicle manufacturer communication systems.

FIG. 5 is a diagram illustrating an example of a process of establishing a connection with the vehicle manufacturer communication system 500 of DCM 1. In S1, communication is established between DCM 1 and the communication carrier network 200. The process in S1 is also referred to as an attach process. In S1, communication is mainly performed between DCM 1 and MME in S200. S2 is the authorization of DCM 1 performed in the step in S1. In S2, in the communication carrier network 200, MME performs, for example, AKA authorization in cooperation with HSS. In S2, DCM 1 is authenticated in the communication carrier network 200 using the information included in the profile information 106A for the communication carrier network 200. Thereafter, DCM 1 is connected to the communication carrier network 200.

In S3, an IPsec tunneling procedure is performed between DCM 1 and ePDG in the vehicle manufacturer communication system 500. In S4, an IPsec tunneling is established between DCM 1 and ePFG of the vehicle manufacturer communication system 500. In IPsec tunneling, one end is an interface of ePDG, and the other end is an interface associated with SIM 106 of DCM 1.

In S5, a process of establishing a connection between DCM 1 and the vehicle manufacturer communication system 500 is performed through IPsec tunneling. In S6, in the vehicle manufacturer communication system 500, AAA cooperates with HSS to perform AKA authorization, for example, in the same manner as MME in the communication carrier network 200. In S6, DCM 1 is authenticated in the vehicle manufacturer communication system 500 using information included in the profile information 105A for the vehicle manufacturer communication system 500. Then, DCM 1 is connected to the vehicle manufacturer communication system 500. Thereafter, DCM 1 can communicate with a PDN such as the Internet through the communication carrier network 200 and the vehicle manufacturer communication system 500. In the vehicle manufacturer communication system 500, communication from DCM 1 is transferred from ePDG to PGW and outputted from PGW to a PDN such as the Internet.

Action Effect of First Embodiment

In the first embodiment, DCM 1 establishes a IPsec tunnel with ePDG of the vehicle manufacturer communication system 500 on the communication carrier network 200, so that communication through the vehicle manufacturer communication system 500 can be performed while using the communication carrier network 200 as an access network. As a result, the owner of the vehicle 10 can select a communication carrier network to be freely contracted from among a plurality of communication carrier networks. In addition, the vehicle manufacturer communication system 500 can allow DCM 1 communication to pass through the vehicle manufacturer communication system 500 without cooperating with a communication carrier network.

Modified Examples

In the first embodiment, since the vehicle manufacturer communication system 500 authenticates the subscriber in the same manner as in the normal EPC, DCM 1 holds the profile data 105A in SIM 105. Alternatively, the vehicle manufacturer communication system 500 may employ an authorization scheme that differs from EPC. In this case, DCM 1 holds, instead of the profile information 105A, the authentication information used in the authentication method adopted by the vehicle manufacturer communication system 500.

In a variant, DCM 1 does not retain the profile info 105A in SIM 105, but instead retains the identity certificate 105B. At the time of purchase of the vehicle, the customer identification document or the like with a facial image such as a driver’s license is submitted from the contractor (owner), and is inspected by a predetermined certification authority to associate the vehicle with the contractor. Further, the key information generated by DCM 1 can be transmitted to the certification authority that cooperates with the vehicle manufacturer communication system 500 to issue an electronic certificate indicating the key information of the subscriber himself/herself. SIM 105B includes the key information and the digital certificate certifying that the key information is the key information of the subscriber himself/herself. DCM 1 uses the identity verification certificate 105B in the authentication in the vehicle manufacturer communication system 500.

As described above, since SIM 105B is based on the identity confirmation document of the contractor, the identity confirmation of the contractor can be performed more firmly by performing the authentication using SIM 105B. The identity verification certificate 105B may be held in a secure storage area outside SIM 105. The identification certificate 105B in the modified example is an example of "authentication information".

Note that the authentication method adopted by the vehicle-manufacturer communication system 500 is not limited to the authentication method using SIM 105B. In addition, DCM 1 may hold authentication information corresponding to an authentication method adopted in the vehicle manufacturer communication system 500 and authentication information approved in advance by the vehicle manufacturer communication system 500 in a secure storage area of the auxiliary storage device 103. DCM 1 may read the authentication information from the secure storage area and receive the authentication at the time of authentication in the vehicle manufacturer communication system 500. In this instance, DCM 1 does not have to hold SIM 105 and only have one SIM of SIM 106.

Other Embodiments

The above-described embodiment is merely an example, and the present disclosure may be appropriately modified and implemented without departing from the scope thereof.

In the first embodiment, it is assumed that the communication carrier network 200 and the vehicle manufacturer communication system 500 are systems corresponding to 4G. However, not limited thereto, the communication carrier network 200 and the vehicle manufacturer communication system 500 may be a 5G, 3G and a system compatible with a mobile communication method after 6G, and when the vehicle manufacturer communication system 500 is a system compatible with 5G, the vehicle manufacturer communication system 500 includes, for example, N3IWF in place of ePDG, UPF in place of PGW, a Unified Data Management (UDM) in place of HSS, a Policy Control Function (PCF) in place of PCRF, and an Authentication Server Function (AUSF) in place of AAA. If the communication carrier network 200 is a system corresponding to 5G, eNB may be replaced by gNB, SGW and MME instead of Access and Mobility Management Function (AMF) and Session Management Function (SMF), and HSS may be replaced by a UDM.

In the first embodiment, the communication of the vehicle 10 is performed via the vehicle manufacturer communication system 500 managed by the manufacturer of the vehicle 10, but the application destination of the technology described in the first embodiment is not limited to the connection between the vehicle 10 and the vehicle manufacturer communication system 500. For example, the present disclosure can be applied to connecting a smart phone or a IoT terminal to a communication device of the manufacturer. Furthermore, the present disclosure can also be applied to a connection between a terminal and a communication system of a third party other than the manufacturer of the terminal. In this case, the terminal includes authentication information (for example, SIM profile information) issued by the communication system of the third party and a program (corresponding to the communication control unit 11) for connecting to the communication system of the third party.

In the first embodiment, an IPsec tunneling is established between DCM 1 and ePDG in the vehicle manufacturer communication system 500, but is not limited thereto. A logical tunnel of an IP layer or more other than IPsec tunnel may be established between DCM 1 and ePDG in the vehicle manufacturer communication system 500.

The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, any type of media suitable for storing electronic instructions, such as magnetic disks (floppy disks, hard disk drives (HDD), etc.), optical disks (CD-ROM, DVD disks, Blu-ray disks, etc.), ROM (read-only memories), random access memories (RAM), EPROM, EEPROM, magnetic cards, flash memories, optical cards, etc.

What is claimed is:

1. An information processing device comprising:

a storage unit that stores authentication information used for connection to a first communication system;

a first Embedded Universal Integrated Circuit Card (eUICC) that holds profile information used for connection to a first carrier network that is selected and for which a contract is made by a user as an access network; and a control unit configured to execute:

establishing the connection with the first carrier network in response to authentication in the first carrier network using the profile information, establishing a logical tunnel with a gateway device in the first communication system, the logical tunnel being on the first carrier network after connection establishment, establishing the connection with the first communication system in response to authentication in the first communication system using the authentication information through the logical tunnel, and after establishing the connection with the first communication system, performing communication with an external network through the logical tunnel on the first carrier network and through the first communication system.

2. The information processing device according to claim 1, wherein:

the authentication information is profile information issued by the first communication system and used for the connection to the first communication system; and the storage unit is a second eUICC.

3. The information processing device according to claim 1, wherein the authentication information is an electronic certificate issued by a predetermined certificate authority when identity confirmation of an owner of the information processing device is performed with respect to key information used in the authentication in the first communication system, and the key information.

4. The information processing device according to claim 1, wherein:

the information processing device is an in-vehicle device mounted on a vehicle; and the first communication system is a communication system managed by a manufacturer of the vehicle.

5. The information processing device according to claim 1, wherein:

the profile information is transmitted to the first carrier network using a first data communication module;

the authentication information is transmitted to the first communication system using the first data communication module; and communication with the external network is performed using the first data communication module.

6. The information processing device according to claim 5, wherein the first data communication module is a radio communication unit.

7. A method, comprising the steps of:

establishing a connection with a first carrier network in response to authentication in the first carrier network using profile information;

establishing a logical tunnel with a gateway device in a first communication system, the logical tunnel being on the first carrier network after connection establishment;

establishing a connection with the first communication system in response to authentication in the first communication system using authentication information through the logical tunnel; and after establishing the connection with the first communication system, performing communication with an external network through the logical tunnel on the first carrier network and through the first communication system.

8. The method according to claim 7, wherein:

the authentication information used for the connection to the first communication system is stored on a storage unit; and a first Embedded Universal Integrated Circuit Card (eUICC) that holds the profile information used for the connection to the first carrier network is held on a first Embedded Universal Integrated Circuit Card (eUICC).

9. The method according to claim 8, further comprising the steps of:

selecting, by a user, the first carrier network; and holding, by the user, a contract to access the first carrier network.

10. The method according to claim 8, wherein:

the authentication information is profile information issued by the first communication system and used for the connection to the first communication system; and the storage unit is a second eUICC.

11. The method according to claim 7, wherein:

the profile information is transmitted to the first carrier network using a first data communication module;

the authentication information is transmitted to the first communication system using the first data communication module; and communication with the external network is performed using the first data communication module.

12. The method according to claim 11, wherein the first data communication module is a radio communication unit.

* * * * *